United States Patent
Boenker, IV et al.

(10) Patent No.: US 7,272,483 B2
(45) Date of Patent: Sep. 18, 2007

(54) VEHICULAR POWER ENHANCEMENT CONTROL SYSTEM

(75) Inventors: Alvin H. Boenker, IV, Weatherford, TX (US); Mark D. Siegel, Fort Worth, TX (US)

(73) Assignee: Quadzilla Performance Technologies, Inc., Fort Worth, TX (US)

( * ) Notice: Subject to any disclaimer, the term of this patent is extended or adjusted under 35 U.S.C. 154(b) by 265 days.

(21) Appl. No.: 11/189,506

(22) Filed: Jul. 26, 2005

(65) Prior Publication Data

US 2007/0024117 A1    Feb. 1, 2007

(51) Int. Cl.
G06F 19/00    (2006.01)
B60L 1/00    (2006.01)

(52) U.S. Cl. ..................................... 701/102

(58) Field of Classification Search ................ 701/102, 701/29, 99, 115; 73/118.1
See application file for complete search history.

(56) References Cited

U.S. PATENT DOCUMENTS

| | | | | |
|---|---|---|---|---|
| 5,315,252 | A * | 5/1994 | Puetz et al. | 701/29 |
| 6,300,870 | B1 * | 10/2001 | Nelson | 340/468 |
| 7,113,854 | B2 * | 9/2006 | Mansell et al. | 701/36 |
| 2007/0068273 | A1 * | 3/2007 | Cunningham | 73/781 |

FOREIGN PATENT DOCUMENTS

EP    0 127 494 A1 * 12/1984
JP    2006-182198 A * 7/2006

OTHER PUBLICATIONS www.cyclonediesel.com/gmc.hm, Cyclone Diesel Performance, GMC Duramax Diesel Performance Parts, printed on Jun. 8, 2005, 8 pages.
http:/www.dieseldynamic.com/duramax.com, Diesel Dynamics, Duramax Computer Power Enhancements, printed on Jun. 8, 2005, 4 pages.
Edge Products Inc., Attitude Instructions, GM Duramax, 2004, 23 pages.
Edge Products Inc., Chevy/GMC Duramex Diesel LB7/Power Edge LB7 EZ / Installation Instruction and Manual, Version 032105, 2005, 14 pages.
http://www.bankspower.com/dynafact.cfm, Gale Banks Engineering, Banks Dynafact Gauges, printed on Jun. 8, 2005, 3 pages.
http:www.bankspower.com/Tech_BetterthanNew.cfm, Gale Banks Engineering, Banks Talk Tech / Making Your Motorhome Better Than New, printed on Jun. 8, 2005, 3 pages.

(Continued)

*Primary Examiner*—Hieu T. Vo
(74) *Attorney, Agent, or Firm*—Haynes and Boone, LLP (57) ABSTRACT

A power enhancement control system for operation with at least one power enhancement device installed in a vehicle comprises a user interface having a display screen operable to display data and a plurality of buttons operable to receive user input, and a control unit coupled to the user interface and in data communication with the at least one power enhancement device. The control unit is operable to set at least one select one of the at least one power enhancement device to a discrete power level setting in response to at least in part to user input and input from a sensor measuring a vehicle operating condition parameter.

25 Claims, 4 Drawing Sheets

OTHER PUBLICATIONS http://www.bankspower.com/system.cfm?appid=AC10&sysid=SC18, Gale Banks Engineering, Chevy/GMC Truck Power / Six-Gun Diesel Tuner, printed on Jun. 8, 2005, 1 page.

http://www.bankspower.com/system.cfm?appid=AD05 &sysid=SD26, Gale Banks Engineering, Dodge Truck Power / Six-Gun Diesel Tuner, printed on Jun. 8, 2005, 1 page.

www.pwa-par.org/newproducts/edge%20products.htm, Performance Warehouse Association, Edge Products, printed on Jun. 8, 2005, 4 pages.

www.rversonline.org/PowerChips.html, RVERS Online, All About Power Chips, printed on Jun. 8, 2005, 3 pages.

http://truckmoxie.tenmagazines.com/ipg.ten-sid-18-bid-0-lid-1195-lpid-18955, TRUCKMOXIE, Bully Dog Technologies, printed on Jun. 8, 2005, 4 pages.

* cited by examiner

VEHICULAR POWER ENHANCEMENT CONTROL SYSTEM

BACKGROUND

Aftermarket power boosting devices have been commercially available to owners of various vehicles to increase the horsepower and/or torque output of their engines. These non-stock devices may alter engine intake-and-exhaust flow, increase fuel delivery, change fuel injection timing, and/or modify transmission shifting settings to achieve enhanced performance.

The typical electronic-based power enhancement devices have a rudimentary user interface. Most employ a multi-position knob that enables the user to rotate the knob to indicate a number of operating level settings. This user interface is independent of any gauges or other user feedback devices that may provide vital engine operating measurements such as exhaust gas temperature. In operation, the user would visually perceive the vehicle's performance condition by monitoring one or more gauges and manually adjust the power enhancement device setting by changing the knob position.

A newer type of electronic-based power enhancement device has been commercially available recently that may be connected to an LCD-based user display and interface that improves the user control within the device. This provides a display of certain engine parameters and receives user input of certain configuration setting that are used by the power enhancement device internally in its computations. For example, the user may enter a maximum exhaust gas temperature. When the engine approaches the user-defined maximum exhaust gas temperature setting, a percentage of defueling or change in fuel injection timing takes place to back down the engine power. The percentage is computed by the power enhancement device. The power enhancement device may consult tables or maps stored in its memory to determine the percentage of defueling or change in injection timing. These existing user interface devices do not receive any vehicle operating condition parameters independent of the power enhancement device and do not perform any computation or analysis on these data other than to display them.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
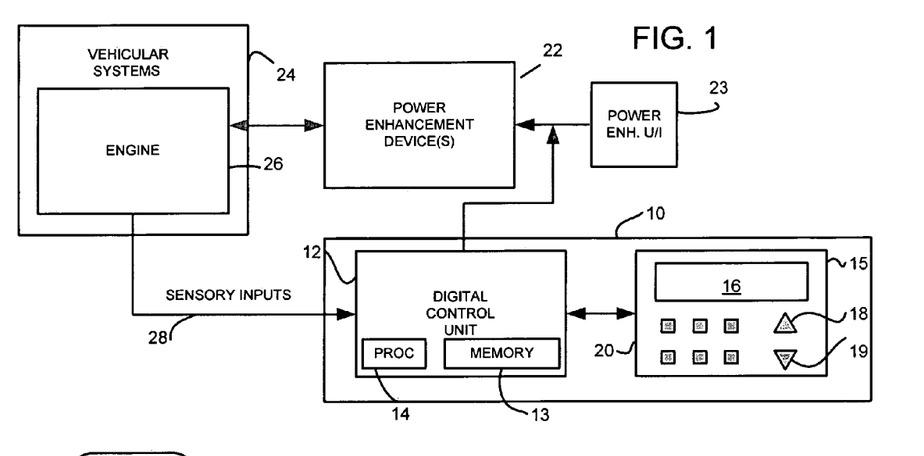
FIG. 1 is a simplified block diagram of an embodiment of a vehicular power enhancement system including a power enhancement control unit.

FIG. 1 is a simplified block diagram of an embodiment of a vehicular power enhancement system including a power enhancement control system 10. Power enhancement control system 10 comprises a digital control unit 12 that includes a memory device 13 and a processor 14. Memory device 13 may include any updatable non-volatile memory that is operable to retain its contents even with the main power source turned off. For example, memory device 13 may include electrically erasable programmable read-only memory (EEPROM), a specific form of EEPROM such as flash memory, static random access memory (SRAM) used in combination with a EEPROM, and other suitable memory devices. Processor 14 may comprise any microprocessor device suitable to this application. Digital control unit 12 is coupled to a user interface 15. User interface 15 comprises a display screen 16 and a plurality of keys, including up and down buttons 18 and 19, operable to receive user data input and selection. The buttons may also include a menu function button and an enter button, for example. The user may, for example, indicate an increase in the desired power level setting by pushing the up button, and further indicate a decrease in the desired power level setting by pushing the down button. Display screen 16 is operable to display a plurality of horizontal lines of text of various fonts and sizes. Display screen 16 may be implemented by any suitable display technology now known or to be developed. Display screen 16 and/or the buttons may be illuminated to enable night-time use.

Digital control unit 12 may be coupled to one or more power enhancement devices 22 and one or more of their user interfaces 23. The power enhancement user interface 23 may be a simple analog multi-position knob or one that incorporates a LCD screen. More specifically, digital control unit 12 is coupled to power enhancement devices (22) via their respective user interface input ports. Digital control unit 12 is operable to issue an instructional signal to the power enhancement device(s) to raise or lower its power level setting, which may range from levels 0 (no power enhancement) to 5 (maximum power enhancement), for example. In general, a power enhancement device 22 is an electronic device that is operable to modify certain operating parameters of one or more vehicular systems 24, such as an engine 26 to increase the power and/or torque output of the engine, for example. Power enhancement device 22 is operable to issue instructions to alter engine intake-and-exhaust flow, increase fuel delivery, change fuel injection timing, modify transmission shifting settings, and/or other changes to vehicle operations. Power enhancement device 22 is operable to make these changes on-the-fly in response to user input and/or vehicle operating conditions that it monitors. Power enhancement device 22 may receive, for example, the engine exhaust gas temperature, manifold absolute pressure, engine coolant temperature, engine oil temperature, fuel injection pressure, and/or other measurements indicative of vehicle operating conditions. When more than one power enhancement devices are "stacked" and used to boost the engine performance of the vehicle, the power enhancement devices may operate to change different aspects of the vehicle system to achieve performance enhancement. Because the digital control unit is operable to control and interface with multiple power enhancement devices, the references herein to a singlular power enhancement device is applicable to multiple power enhancement devices coupled to the control unit unless explicitly stated otherwise.

Digital control unit 12 is also coupled to engine 26 and/or other vehicular systems 24 to receive these measurements and/or other sensory data 28 via one or more input/output ports. For example, one input to digital control unit 12 may be an altitude measurement received from an altimeter (not explicitly shown). Because the altitude at which the vehicle is operating is indicative of the oxygen content of the ambient atmosphere, digital control unit 12 may instruct the power enhancement device to change its power level setting, so that the fuel delivery or timing to the engine is adjusted accordingly. Digital control unit 12 may monitor and operate in response to other vehicular operating condition measurements such as tire pressure, fuel level, ambient temperature, engine load, RPM, speed, transmission clutch slippage, turbo boost level, global positioning system (GPS) position data, etc.

Because performance enhancement control system 10 is operable to provide simple power level setting instructions to the power enhancement devices, it may be compatibly used to interface with and control power enhancement devices of any make and model. These power enhancement devices are compatible with system 10 as long as it is operable to receive a power level setting of 0 to N, where level 0 is no power enhancement and N is maximum power level. For example, the power enhancement devices may operate at 0 to 5 power levels.

Figure 2:
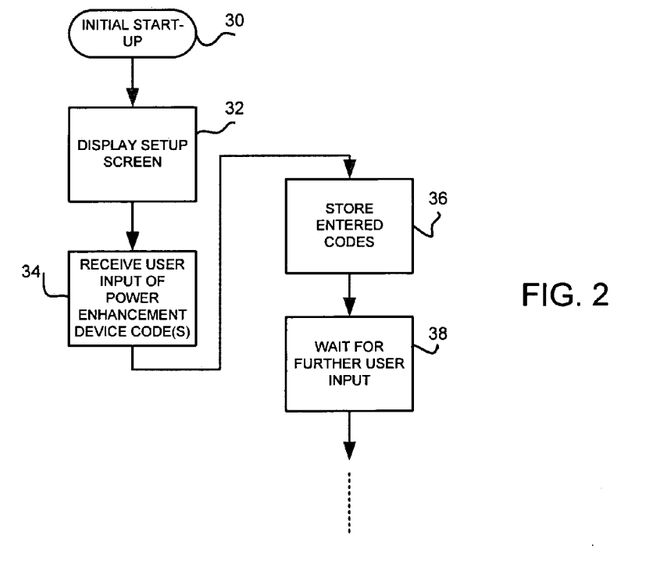
FIG. 2 is a simplified flowchart of an embodiment of an initial start-up process of a power enhancement control process.

FIG. 2 is a simplified flowchart of an embodiment of an initial start-up process 30 of a power enhancement control process. The first time the user powers up power enhancement control system 10 after it has been installed in a vehicle, process 30 is preferably carried out to configure the system. In step 32, a display setup screen is displayed by user interface 15. The displayed screen may greet the user and prompt the user to enter one or more sets of identification codes representing the make and model of one or more power enhancement devices coupled to digital control unit 12. The identification codes may be displayed by the user interface upon a request from the user or may be found in a user manual that accompanies digital control unit 12. In steps 34 and 36, the codes entered by the user are received and stored in memory. The identification of the power enhancement devices that will operate under the control of digital control unit 12 may aid in the determination of how the power level settings of the power enhancement devices should be controlled in response to vehicle operating conditions. Thereafter, in step 38, the digital control unit waits for user inputs.

It should be noted that process 30 may also be initiated by user request. For example, the user may have used the power enhancement control system with a first power enhancement device for a period of time. Thereafter, the user may install a second power enhancement device in the vehicle and couple the second device to the control system. The user may then enter the identification code of the second device into the control system so that subsequent operations may take it into account.

Figure 3:
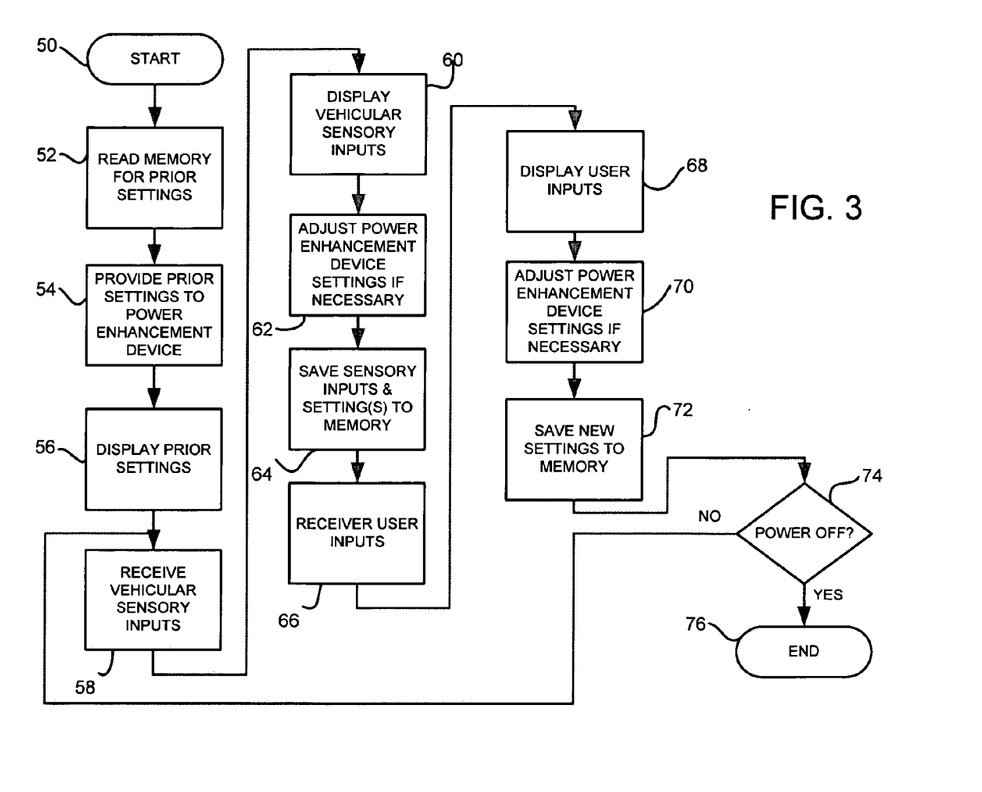
FIG. 3 is a simplified flowchart of an embodiment of a power enhancement control process.

FIG. 3 is a simplified flowchart of an embodiment of a power enhancement control process 50. In step 52, upon power up, memory device 13 is read to retrieve the prior operating parameter settings. For example, if prior to power down the user had set the power level to level three (3), this power level setting was saved to memory and is read from memory upon power-up. In step 54, the prior settings read from memory are then provided to power enhancement device 22 so that it may begin to operate according to the prior settings instead of starting at default settings. In step 56, the prior settings read from memory or a selected one or more prior settings are displayed on display screen 16 of user interface 15. This display may last a predetermined amount of time or until some predetermined event such as user input or sensor input updates, for example. Digital control unit 12 receives vehicular system sensory inputs in step 58, and displays the received inputs or a selected set of the received sensory inputs on the display screen 16 in step 60. In step 62, the power enhancement device may perform computations and determine that certain power enhancement settings are to be adjusted in response to the sensory inputs. In step 64, the received sensor inputs and settings are saved to memory. In step 66, user inputs, if any, are received. In step 68, the received user inputs are echoed or otherwise reflected on the display screen so that the user may perceive that his/her selections are being received by the system. In step 70, the power enhancement settings of power enhancement device 22 is adjusted in response to the user input, if needed. In step 72, the new settings are saved to memory. If the system is turned off, then the process ends in step 76, otherwise, execution loops back to step 58 to continue to monitor and process incoming vehicular sensory inputs and user inputs.

In operation, if the user has set the power level to five (5) out of five (5), indicating a setting at the highest power level, and digital control unit 12 receives engine parameter inputs such as exhaust gas temperature that has reached or exceeded a predetermined or user-provided maximum setting, then control unit 12 automatically sends a new power level setting to power enhancement device 22. For example, digital control unit 12 may instruct the power enhancement device to drop the power level setting to four (4) or the next lower power level. Digital control unit 12 is in effect mimicking what a user would do when the exhaust gas temperature has reached or exceeded the maximum setting, i.e. to turn the knob down one notch to a lower power setting to prevent engine overheating. In response to this input, power enhancement device 22 immediately changes the fuel delivery, fuel injection timing, and/or other inputs to the engine to back down the engine to the next lower power level. This action automatically and quickly produces a prompt response from the engine and enabling the exhaust gas temperature to decrease. Accordingly, power enhancement control system 10 is operable to mimic a user's manual response to a sensory input to back down the power level automatically and much more quickly.

When power enhancement control system 10 is coupled to more than one power enhancement device, selected or all power enhancement devices may be instructed thereby to back down to the next lower power level depending on user settings, default settings, vehicle operating conditions, and other factors. The power enhancement devices may be instructed to back down to the next lower power level sequentially or simultaneously.

In comparison, existing power enhancement devices typically receives sensory inputs and performs calculations to back down the engine operation a certain percentage, such as reducing the amount of fuel delivery by a certain percentage, rather than back down by a power level. These devices reduce the power setting gradually and slowly until the sensory measurement is below the maximum setting. Due at least in part to the prolonged response time to back down the engine, the makers of these devices strongly advise its users to not use more than one power enhancement device for fear of severely damaging the engine or other components of the vehicle.

Figure 4:
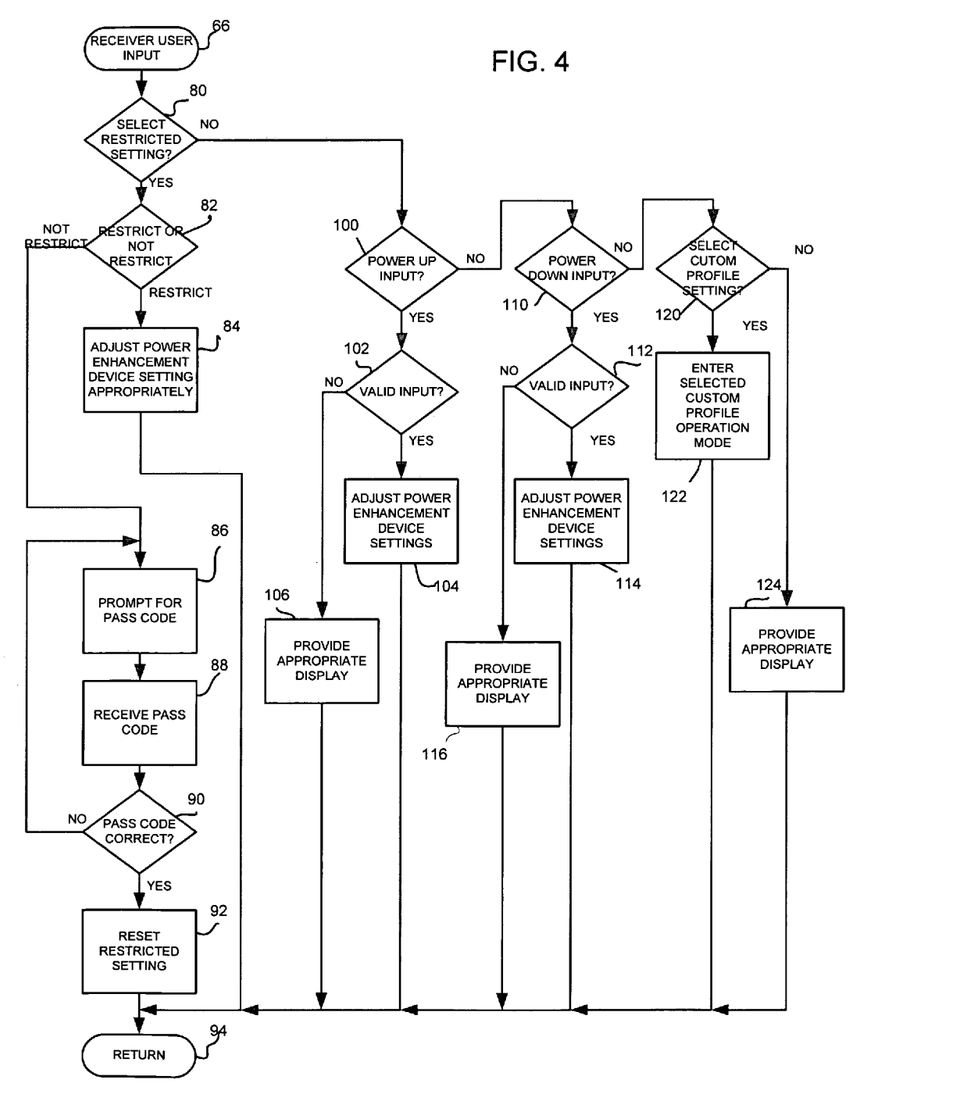
FIG. 4 is a simplified flowchart of an embodiment of a process to receive and process user input of the power enhancement control system.

FIG. 4 is a simplified flowchart of an embodiment of a process 66 to receive and process user input of the power enhancement control unit. In step 80, a determination is made as to whether the user has selected restricted setting from a menu or a list of user-input options. The restricted setting enables the user to disable the power enhancement devices so that the vehicle operates without power enhancement from the power enhancement devices. This option is especially useful to quickly disable the power enhancement device when the control of the vehicle is given to a valet for parking it, for example. In effect, the restricted mode enables the user to set the power level to zero (0). This feature is preferably password protected so that unauthorized users cannot take the power enhancement devices out of the restricted setting without the proper password.

If the user has selected the restricted setting, then in step 82 a determination is made as to whether the selection indicates restricting or not restricting the power enhancement device. If the power enhancement device has already been disabled, then the user's selection is assessed to intend to re-enable the power enhancement device. If the power enhancement device is not disabled, then the user's selection is assessed to intend to disable the power enhancement device. If restriction is intended to be applied, then the digital control unit adjusts the power enhancement device setting to power level zero in step 84 and execution ends. Otherwise in step 86, the digital control unit prompts the user to enter a pass code or password. The pass code may be set previously during the initial start-up sequence or at the request of the user. In step 88, the pass code is received via user interface 15. In step 90, the pass code is verified. If the pass code entered by the user is not correct, then the user is prompted again for the pass code in step 86. Although not shown explicitly, an error handling process may be initiated if the user has failed to enter the correct pass code after a predetermined number of tries. If the pass code is verified as correct, then the digital control unit resets the restricted setting so that the power enhancement features are enabled in step 92. Execution of the process then ends in step 94.

If at step 80 the determination is made that the user has not selected the restricted setting function, then in step 100 a determination is made as to whether the user has provided input that indicates a desire to increase the power level of the power enhancement devices. For example, depending on the configuration of user interface 15, user may push up button 18. If the user has indicated a desire to increase the power level setting, then in step 102 a determination is made as to whether a valid user input was received. For example, the user may have pushed the up button when the power level is already at maximum setting. If desired, an appropriate message may be displayed by user interface 15 to inform the user in step 106. Otherwise, if the user input is valid, then in step 104 the new power level setting is conveyed to the power enhancement device.

Although not shown explicitly, method 66 may include suitable delay time to ensure that all user input is received before action is made to carry out the user request. For example, the user may push the up button three times when the current power setting is at power one (1). Method 66 waits a predetermined amount of time to receive all three button pushes or waits until the user is no longer providing any more input to make the power level adjustment. Preferably, the user display provides immediate visual feedback to the user to indicate the receipt of user input as soon as the user input is received. For example, as soon as the user pushes the up button the first, second and third times, the power level setting display is increased appropriately by one, two and three levels. After the power level setting has been adjusted, execution ends.

If at step 80 the determination is made that the user has not selected the restricted setting function and that the user has not indicated an increase in power level setting, then in step 120 a determination is made as to whether the user has provided input that indicates a desire to decrease the power level of the power enhancement devices. For example, depending on the configuration of user interface 15, user may push down button 19. If the user has indicated a desire to decrease the power level setting, then in step 112 a determination is made as to whether a valid user input was received. For example, the user may have pushed the down button when the power level is already at the lowest setting. If desired, an appropriate message may be displayed by user interface 15 to inform the user in step 116. Otherwise, if the user input is valid, then in step 114 the new power level setting is conveyed to the power enhancement device.

Although not shown explicitly, method 66 may include suitable delay time to ensure that all user input is received before action is made to carry out the user request. For example, the user may push the down button three times when the current power setting is at power five (5). Method 66 waits predetermined amount of time to receive all three button pushes or waits until the user is no longer providing any more input to make the power level adjustment. Preferably, the user display provides immediate visual feedback to the user to indicate the receipt of user input as soon as the user input is received. For example, as soon as the user pushes the down button the first, second and third times, the power level setting display is decreased appropriately by one, two and three levels. After the power level setting has been adjusted, execution ends.

The received user input may instead indicate a selection of custom profile settings as determined in step 120. In response to this user input, such as a selection from a menu, execution enters a custom profile operation mode in step 122. Custom profile operation enables the user to enter the set points for various vehicle operating parameters as well as the logic to trigger changing the vehicle power performance settings. Step 122 is described in more detail in FIG. 5 below. If the user input is not indicative of any of the previously described options, for example, the user has pushed one or more buttons in a sequence or combination that is not recognized by the control unit, then an appropriate message is displayed by the user interface in step 124. The execution returns in step 94.

Figure 5:
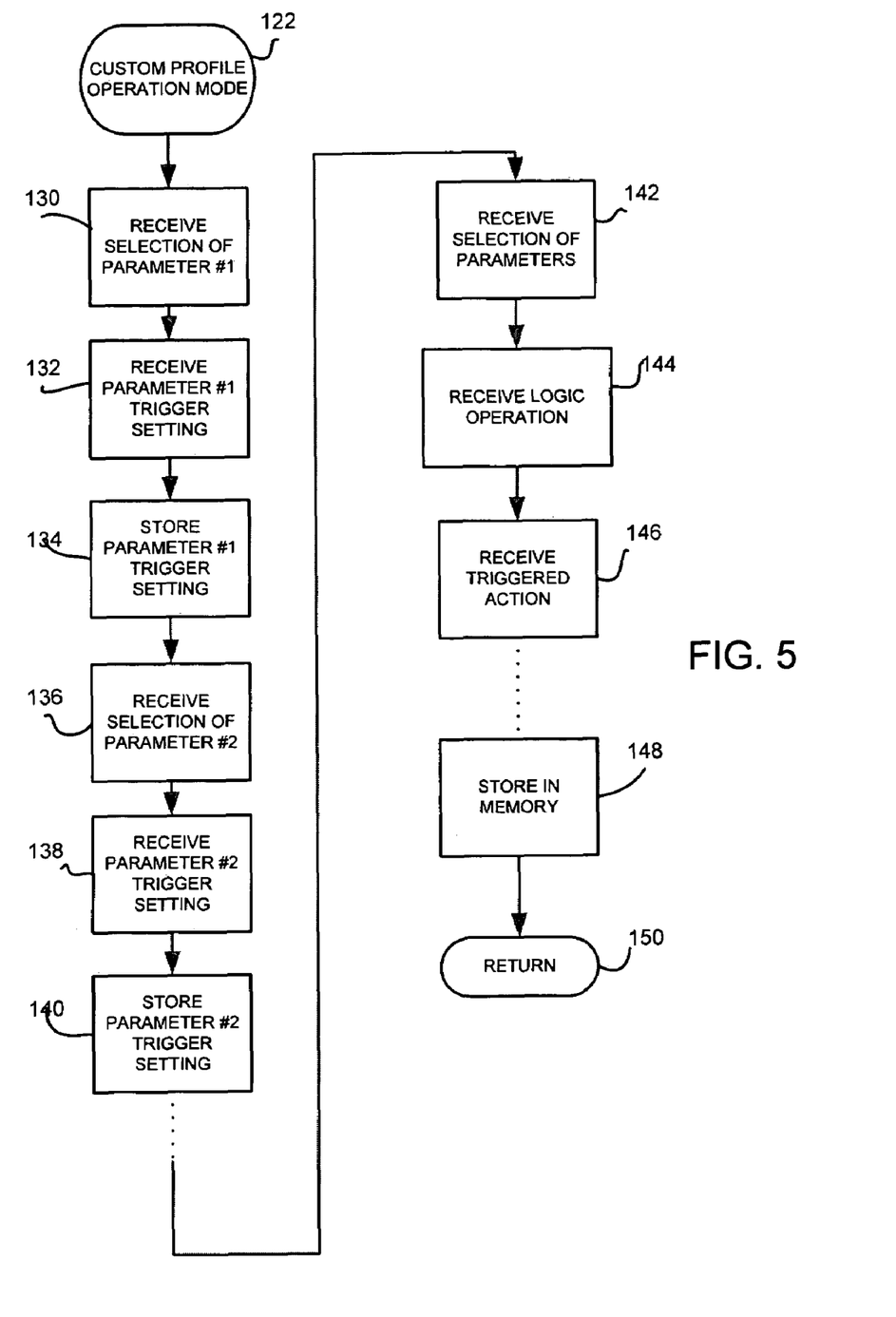
FIG. 5 is a simplified flowchart of an embodiment of a process to receive and process user inputs for setting a custom profile operation mode of the power enhancement control system.

FIG. 5 is a simplified flowchart of an embodiment of a process 122 to receive and process user inputs for setting a custom profile operation mode of the power enhancement control unit. Custom profile operation enables the user to enter the set points for various vehicle operating parameters as well as the logic to trigger changing the vehicle power performance level settings, for example. The custom profile provided by the user takes precedence over any default setting of the digital control unit, if any. In step 130, a user selection of a first parameter is received. In step 132, the user's entry of the trigger setting for the selected parameter is received. In step 134, the selected parameter trigger setting is stored. Subsequently, the user may enter additional parameters and trigger settings, which are stored in memory, as shown in steps 136-140. For example, the user may select, from a menu or list, the atmospheric pressure parameter. The user may then enter a trigger setting of 6.89 PSI (pound per square inch) as a minimum setting for this parameter. The atmospheric pressure parameter trigger setting is then saved in memory. The user may then select a second parameter of exhaust gas temperature and then enter a trigger setting of 1275 degrees Fahrenheit (° F.) as the maximum trigger point for this parameter. This exhaust gas temperature trigger setting is then saved in memory. The user may continue to enter additional parameters and trigger settings to be stored.

In step 142, the user may then select one or more parameters that has been entered and stored. The user display may display a list of stored user parameters to enable the user to select them. Alternatively, the user display may display all possible parameters, including ones not defined by the user with trigger settings. If the user selects a parameter that has not been previously defined with a trigger setting, then the user is prompted to enter it. In step 144, the user is prompted to enter a selection of a logic operation. The logic operations may include AND, OR, EXOR, NOR, NAND, NOT, etc. Alternatively, arithmetic, <, >, =, not equal to, etc. or other operations may be permitted. In step 146, the user is then prompted to enter the action to be triggered when the specified logic operation result is true. These user settings are stored in memory in step 148 and execution returns in step 150.

For example, the user may select atmospheric pressure and exhaust gas temperature parameters. The user's input of a logic AND is then received. The user then enters a desired action of setting the power level to level one (1) as the triggered event. Therefore, this set of user input instructs the control unit to set the power enhancement device at power level one (1) if the atmospheric pressure is at or below 6.89 PSI AND the exhaust gas temperature reaches or exceeds 1275° F.

The control system described herein is operable to provide instructions specifying a discrete power level setting to one or more power enhancement devices. These instructions may be generated as a response to a user input of a specific discrete power level or to the measurement(s) of certain vehicle operation condition parameter(s). Unlike conventional user interfaces, which act solely as a user display and user input device, the control system described herein receives and monitors vehicle operation condition measurements in order to automatically modify the power enhancement device settings. Because the control system described herein communicates discrete power level settings to the power enhancement devices rather than device-specific data, it is compatible with all power enhancement devices and may be used to control their power level settings. Although the disclosure above explicitly refers to a visual feedback of vehicle performance status and conditions, as well as control unit operating status, audio prompts, utterances and alerts may be incorporated in the control unit in addition to the visual cues.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A power enhancement control system for operation with at least one power enhancement device installed in a vehicle, comprising:
   a user interface having a display screen operable to display data and a plurality of buttons operable to receive user input; and
   a control unit coupled to the user interface and in data communication with the at least one power enhancement device, the control unit operable to set at least one select one of the at least one power enhancement device to a discrete power level setting in response to at least in part to user input and input from a sensor measuring a vehicle operating condition parameter.

2. The system of claim 1, wherein the control unit comprises a memory operable to store and save a current power level setting of the at least one power enhancement device.

3. The system of claim 1, wherein the control unit comprises a non-volatile memory operable to store and save a current power level setting of the at least one power enhancement device.

4. The system of claim 1, wherein the control unit is in data communication with at least one sensor selected from the group consisting of engine exhaust gas temperature sensor, manifold absolute pressure sensor, engine coolant temperature sensor, engine oil temperature sensor, fuel injection pressure sensor, altimeter, tire pressure sensor, fuel level sensor, ambient temperature thermometer, engine load sensor, RPM sensor, speedometer, transmission clutch slippage sensor, turbo boost level sensor, and global positioning system (GPS) satellite receiver.

5. The system of claim 1, wherein the plurality of buttons comprises an up button and a down button.

6. The system of claim 1, wherein the control unit comprises a plurality of input/output ports operable for connection with a plurality of power enhancement devices.

7. A method for controlling at least one power enhancement device installed in a vehicle, comprising:
   receiving and storing at least one identification code representative of the at least one power enhancement device;
   restoring the at least one power enhancement device to a previously-stored discrete power level, if any;
   receiving a user input of a discrete power level and setting the at least one power enhancement device to the user-specified discrete power level; and
   receiving at least one vehicle operating condition parameter measurement and setting the at least one power enhancement device to a discrete power level in response at least in part to the user-specified discrete power level and the at least one vehicle operating condition parameter measurement.

8. The method of claim 7, further comprising:
   receiving and storing user-specified custom profile data including vehicle operating condition parameter trigger settings and associated triggered discrete power level; and
   changing the at least one power enhancement device discrete power level setting to the triggered discrete power level in response to the vehicle operating condition parameters reaching the trigger settings.

9. The method of claim 8, wherein receiving and storing user-specified custom profile data comprises receiving and storing a logic operation.

10. The method of claim 7, further comprising storing the discrete power level setting of the at least one power enhancement device.

11. The method of claim 7, further comprising storing the at least one vehicle operating condition parameter measurement.

12. The method of claim 7, further comprising:
receiving a user selection of a restricted operating mode; and
setting the discrete power level of the at least one power enhancement device to zero.

13. The method of claim 12, further comprising:
receiving a user selection of exiting the restricted operating mode;
prompting the user for a password;
receiving a password;
verifying the password; and
setting the discrete power level of the at least one power enhancement device to a previous setting in response to a verified password.

14. The method of claim 7, further comprising selectively setting the power level of a plurality of power enhancement devices to a discrete power level in response to user input and the at least one vehicle operating condition parameter measurement.

15. The method of claim 7, further comprising simultaneously setting the power level of a plurality of power enhancement devices to a discrete power level in response to user input and the at least one vehicle operating condition parameter measurement.

16. The method of claim 7, further comprising displaying the discrete power level of the at least one power enhancement device.

17. A computer-readable medium having encoded thereon a method for controlling at least one power enhancement device installed in a vehicle, comprising:
reading a previously-stored discrete power level;
restoring the at least one power enhancement device to the previously-stored discrete power level;
receiving a user input of a discrete power level and setting the at least one power enhancement device to the user-specified discrete power level; and
receiving at least one vehicle operating condition parameter measurement and setting the at least one power enhancement device to a discrete power level in response at least in part to the user-specified discrete power level and the at least one vehicle operating condition parameter measurement.

18. The method of claim 17, further comprising:
receiving and storing user-specified custom profile data including vehicle operating condition parameter trigger settings and associated triggered discrete power level; and
changing the at least one power enhancement device discrete power level setting to the triggered discrete power level in response to the vehicle operating condition parameters reaching the trigger settings.

19. The method of claim 18, wherein receiving and storing user-specified custom profile data comprises receiving and storing a logic operation.

20. The method of claim 17, further comprising storing the discrete power level setting of the at least one power enhancement device and the at least one vehicle operating condition parameter measurement.

21. The method of claim 17, further comprising:
receiving a user selection of a restricted operating mode; and
setting the discrete power level of the at least one power enhancement device to zero.

22. The method of claim 21, further comprising:
receiving a user selection of exiting the restricted operating mode;
prompting the user for a password;
receiving a password;
verifying the password; and
setting the discrete power level of the at least one power enhancement device to a previous setting in response to a verified password.

23. The method of claim 17, further comprising selectively setting the power level of a plurality of power enhancement devices to a discrete power level in response to user input and the at least one vehicle operating condition parameter measurement.

24. The method of claim 17, further comprising simultaneously setting the power level of a plurality of power enhancement devices to a discrete power level in response to user input and the at least one vehicle operating condition parameter measurement.

25. The method of claim 17, further comprising receiving and storing at least one identification code representative of the at least one power enhancement device.

* * * * *